Feb. 18, 1964 R. E. LIETZ 3,121,483
SHIFT INDICATOR
Filed Feb. 28, 1961

INVENTOR.
Richard E. Lietz
BY
A. M. Heiter
ATTORNEY

United States Patent Office 3,121,483
Patented Feb. 18, 1964

3,121,483
SHIFT INDICATOR
Richard E. Lietz, Milwaukee, Wis., assignor to General Motors Corporation, Detroit, Mich., a corporation of Delaware
Filed Feb. 28, 1961, Ser. No. 92,271
17 Claims. (Cl. 192—.092)

This invention relates to a shift indicator and particularly a shift indicator to enable an operator to economically operate an engine and transmission unit.

The shift indicator control system employs engine speed and manifold vacuum controlled in accordance with the gear ratio engaged in the transmission to control a downshift signal indicator and an upshift indicator which may apply a feel force to the accelerator pedal to indicate to the operator of the vehicle when a downshift should be made and when an upshift should be made to obtain the most economical engine operating conditions in certain drive ratios of transmission operation.

An object of the invention is to provide a control system responsive to engine speed and engine torque demand controlled in accordance with the ratio in which the transmission is operating to provide a signal when a downshift or an upshift of the transmission is required to provide optimum fuel economically in the operation of the engine.

Another object of the invention is to provide a control system responsive to engine speed and engine manifold vacuum controlled in accordance with the ratio in which the transmission is operating to provide a signal when a downshift or an upshift of the transmission is required to provide optimum fuel economically in the operation of the engine.

Another object of the invention is to provide a control system for an engine transmission unit operative in response to engine speed, transmission drive ratio and torque demand operative to apply a feel force to the accelerator pedal to indicate to the operator when a shift should be made to obtain the most economical engine operating conditions.

These and other objects of the invention will be more apparent from the following description and drawing of a preferred embodiment of the invention.

Figure 1:
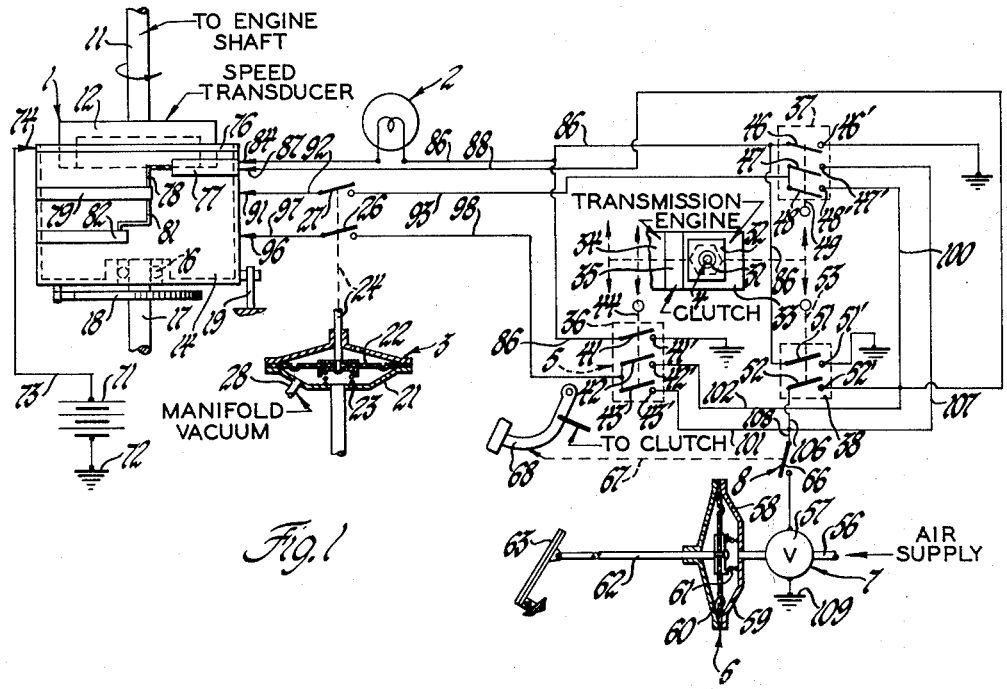

FIGURE 1 diagrammatically shows the signal control system.

Figure 2A:
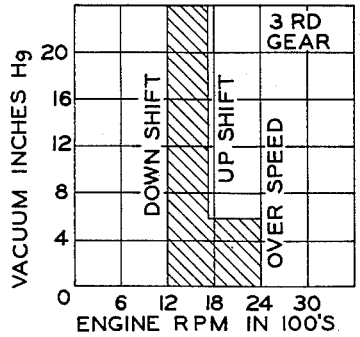
Figure 2B:
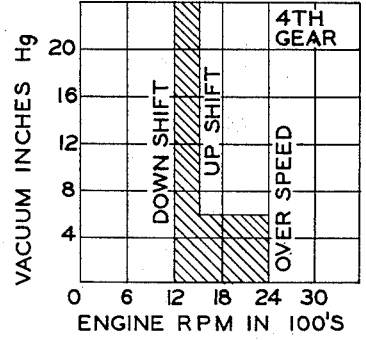
Figure 2C:
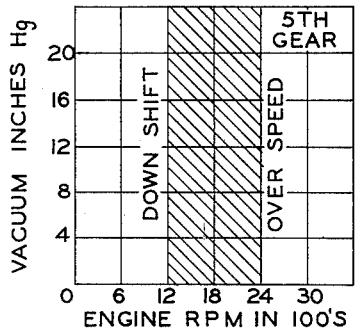

FIGURES 2a, 2b and 2c are graphs showing the optimum operating ranges as defined in third, fourth and fifth gear respectively.

The invention is illustrated schematically in FIGURE 1 in an electric shift indicator for use with a five-speed transmission. The electric shift indicator will provide a signal to actuate an indicator device to give an indication to the operator so that he can properly schedule the shifting points to obtain the most economical engine operating ranges for third, fourth and fifth gear operation, as shown by the graphs in FIGURE 2.

The electric shift indicator system, as shown in FIGURE 1, consists of a speed transducer 1, a downshift panel light 2, a manifold vacuum switch 3, the shift lever of the five-speed transmission 4, gear ratio switches 5, the power diaphragm 6, the solenoid valve 7 and the clutch switch 8.

The speed transducer 1 has a magnetic drag cup assembly of the type used in conventional automotive speedometers with the cup moving to indicate the speed. In this installation, the speedometer, or transducer drive shaft 11, is connected to the distributor or fly-wheel and thus operates at or is indicative of engine speed, rather than vehicle speed. The shaft 11 rotating, as indicated by the arrow, rotates the transverse magnetic member 12 which by magnetic drag rotates the cup 14 which is mounted by a bearing 16 on a stationary shaft 17 fixed to a stationary support member. The cup is thus moved with an increasing force with increasing speed of shaft 11 in the same direction against the biasing force of coil spring 18 connected between the cup and support shaft 17 to tend to bias the cup 14 to the zero speed position in which the stop member 19 limits movement.

The downshift signal light 2 consists of the light 2 connected in the circuit to indicate that a downshift should be made for the most economical engine operating conditions. It is thus seen that the circuit provides a downshift signal, flow of current through connector 86, which may be employed to operate an indicating light or other type of indicator or to provide a signal in automatic transmissions automatically downshifting the transmission.

The manifold vacuum switch 3 consists of a vacuum actuator having a cup-shaped housing 21 with a flexible diaphragm 22 closing the open side. The spring 23 normally holds the diaphragm in the position shown in which the connector rod 24 holds the switch blades 26 and 27 in open position when the manifold vacuum is below 6 inches of mercury indicative of heavy load and high throttle opening and thus efficient engine operation. The manifold of engine 34 is connected by a passage 28 to the interior of housing 21 and when the manifold vacuum of the engine is above six inches of mercury vacuum indicative of light loads and low throttle opening and thus inefficient engine operation, the atmosphere will act on the diaphragm 22 to compress the spring 23 and move the switch blades 26 and 27 to the closed position permitting operation of the upshift signal.

The shift linkage 4 for a five-speed automatic transmission 33 connected by clutch 35 to engine 34, illustrated in FIGURE 1, is arranged in the conventional manner to actuate the transmission and includes a shift lever 31 pivotally mounted on a support 32 and controlling a five-speed transmission 33. A portion of lever 31 spaced from the pivot moves in the dotted line path to the reverse R and first to fifth ratio positions shown and is operative in the third, fourth and fifth ratio positions to contact the respective switch actuator to close the respective ratio switch when the transmission is operating at that ratio. The ratio switches 5 consist of a third ratio switch 36, a fourth ratio switch 37 and a fifth ratio switch 38, all shown in the normal open position in which they are held by a suitable biasing spring. The third ratio switch 36 has blades 41, 42 and 43 actuated by an actuator 44, which is moved from the open position shown to the closed position when the shift lever 31 is in third ratio position. The fourth ratio switch 37 has blades 46, 47 and 48 actuated by an actuator 49 shown in the normally opened position. When the shift lever is moved from the neutral position shown to the fourth ratio position to engage fourth ratio, the lever 31 engages actuator 49 to close the switch 37. The fifth ratio switch 38 has blades 51 and 52 and an actuator 53 and is normally in the open position shown. When the shift lever 31 is moved to the position shown by the dotted line and arrow, it engages fifth ratio and moves the actuator 53 to close the switch 38.

A supply of fluid such as air or hydraulic fluid under pressure is connected by a passage 56 through a solenoid actuated cutoff valve 57 which is in the off position when current is not supplied to the valve solenoid. When current is supplied, the valve connects the air supply via passage 56 to the operating chamber 58 of a diaphragm motor 6. The motor has a cup-like housing 59, diaphragm 60 and a spring 61 to hold the diaphragm in the normal position shown. When air is supplied to the chamber 58 to move the diaphragm the pushrod 62 applies a force to accelerator pedal 63 resisting movement in the throttle opening direction.

A clutch switch 8 consisting of a blade 66 and an operator 67 is connected to the clutch operating mechanism so that the switch blade 66 is open to de-energize the solenoid valve when the clutch is in or disengaged. Clutch pedal 68 is shown in the clutch in or clutch disengaged position in which switch 66 is open to de-energize solenoid 57 to relieve the force applied by motor 6 on the throttle pedal.

Power for the circuit is provided by a battery 71 connected to ground 72 and via conductor 73 and contact 74 to a printed contact strip 76 on the base of drum 14 extending through the full cycle of rotation of the drum to provide contact at all times. As shown, the drum rotates in the range of operation, from zero to maximum engine speed, through one-half of one revolution. Thus contact 76 extends over half the circumference of the drum. Contact 76 is connected to the low speed contact 77 providing contact from zero to 1200 engine r.p.m. Contact 77 is connected by a conductor 78 to the intermediate contact 79 which extends from 1560 engine r.p.m. to maximum engine r.p.m. This intermediate contact 79 connected with conductor 81 to the high speed contact 82 which extends from 1750 engine r.p.m. to maximum engine r.p.m. The low speed contact 77 is connected by a brush 84 and conductor 86 through the downshift light 2 to the blade 46 of switch 37, the blade 41 of switch 44, and blade 51 of switch 38. The low speed contact 77 is also connected by a brush 87 and conductor 88 to a contact 52' cooperating with switch blade 52 and by branch 100 to contact 48' of switch 37 and branch 102 to contact 42 of switch 36. The intermediate speed contact 79 is connected above 1500 r.p.m. by a brush 91 and conductor 92 through switch blade 27 to conductor 93 to the blades 47—48 of the fourth ratio switch 37. The high speed contact 82 is connected by a brush 96, conductor 97, switch blade 26, and conductor 98 to the switch blades 42—43 of the third ratio switch 36. The contacts 41', 46' and 51' are connected to ground, thus inter-connected. Contact 43' of switch 36, contact 47' of switch 37 and blade 52 of switch 38 are connected by conductor branches 101, 107 and 106 respectively to conductor 108 connected through switch 2 and solenoid valve 57 to ground 109.

*Operation*

The speed transducer positions the cup 14 and the printed circuit thereon in accordance with engine speed. For engine speeds under 1200 r.p.m. when any one of the ratio switches 5 are closed by actuation of the shift lever to shift the transmission to third, fourth or fifth gear operation and the clutch is engaged to close switch 8, current is supplied to soleniod valve 57 to open the valve to supply fluid under pressure to the motor 6 to apply a force to the accelerator pedal tending to close the throttle. This force is small and can be overcome by the operator's manual effort to open the throttle. Current is also supplied to light the downshift light 2. This additional resistor force applied to the operator's or driver's foot through the throttle pedal and the energizing of the downshift light indicate to the driver that a downshift should be made to prevent lugging or overloading the engine. The circuit for providing this signal can be readily traced from battery 71 which supplies current via conductor 73 and contact brush 74 to the low speed contact plate 77 which, between zero and 1200 r.p.m., supplies current to line 88 which is connected directly and via branches 100 and 102 to the third, fourth and fifth ratio switches. If the third ratio switch 36 is closed, the circuit is completed via connected switch blades 42 and 43, and branch 101 to conductor 108. If the fourth ratio switch is closed, the circuit is completed through connected switch blades 47—48, and branch 107 to conductor 108. If the fifth ratio switch 38 is closed, the circuit is completed through blade 52 and branch 106 to conductor 108. Thus if any one of the ratio switches are closed, the circuit is completed to conductor 108, and if the clutch is engaged to close switch 8, current will be supplied to actuate solenoid valve 57 to supply fluid under pressure to motor 6 to apply a force resisting opening movement of the accelerator pedal 63. The downshift light 2 is energized under these conditions since contact 77 below 1200 r.p.m. supplies current to line 86 which is connected to ground either by the third ratio switch through blade 41 and ground contact 41', or the fourth ratio switch 37 via blade 46 and ground contact 46' or the fifth ratio switch 38 via blade 51 and ground contact 51'.

The upshift signal is provided by actuation of the solenoid valve only. The schedule calls for operation when the transmission is in third gear at engine speeds above 1750 r.p.m. at manifold depressions in excess of six inches of mercury, see FIGURE 2. The actuation of the solenoid valve 57, as explained above, provides a force resisting opening movement of the accelerator pedal 63. The circuit completed to provide this operation is from the high-speed contact 82 which supplies current above 1750 r.p.m. via brush 96 to conductor 97. When the manifold vacuum is above six inches of mercury, switch blade 26 is closed energizing conductor 98. When the transmission is in third ratio, switch blade 43 in the third ratio shift valve 36 is closed supplying current in branch line 101 and line 108, which, if the clutch valve 8 is closed, energizes solenoid valve 57. Operation of system below six inches of manifold vacuum opens the manifold vacuum switch blade 26 to break the circuit and prevent actuation of the solenoid valve 57 which supplies the signal force to the accelerator pedal.

In fourth gear operation the upshift signal is scheduled to occur at engine speeds above 1560 r.p.m. when the engine depression is in excess of six inches of mercury. This signal similarly actuates the solenoid valve to resist throttle opening movement. The circuit providing this signal is made when the intermediate speed contact 79 contacted by brush 91 supplies current to conductor 92. If the manifold depression is above six inches of mercury, switch blade 27 is closed energizing conductor 93 which, in fourth ratio, is connected by switch blade 47 to branch 107 of conductor 108. If the clutch is engaged, conductor 108 energizes solenoid valve 57.

FIGURES 2a, 2b and 2c show respectively in the shaded area the optimum range of operation for the third, fourth and fifth gear ratios. Thus it will be seen that in each ratio below 1200 engine r.p.m., the downshift signal is operated. In third ratio, the upshift signal is operated above 1750 r.p.m. and over six inches of mercury engine depression. In fourth ratio the upshift signal is operated above 1560 engine r.p.m. and above six inches of mercury engine depression. In fifth ratio, the highest ratio illustrated transmission there is no upshift signal.

In order to allow the driver to downshift and increase the engine speed by increasing the throttle, the clutch disengagement action is arranged to actuate valve 8 to de-energize solenoid valve 57 to remove the force resisting throttle increase. Thus the operator can easily increase the engine speed to obtain a proper downshift.

These controls make it possible for the vehicle operator to operate the engine and transmission in a manner to obtain the best fuel economy. If the vehicle is operating in fifth gear and the engine speed is below 1200 r.p.m. causing lugging or overloading and thus inefficient engine operation, the downshift signal light 2 and the resistance applied to the accelerator pedal will signal a downshift. Though the downshift to fourth ratio will normally increase engine speed above 1200 r.p.m., if it does not the downshift signal will be energized calling for a further downshift from fourth to third ratio. In third ratio the downshift signal will be provided in the same way under 1200 r.p.m.

Under light load and throttle conditions the engine also operates inefficiently. Thus under these conditions, indicated by more than six inches of mercury engine manifold vacuum, the vacuum switch 3 closes permitting operation of the upshift signal, only the resisting force applied to the accelerator pedal. In third ratio and fourth ratio this signal is energized at 1750 r.p.m. and 1560 r.p.m. respectively to call for an upshift to maintain a high load on the engine for efficient operation.

It will be appreciated that the figures given above as to engine speed and manifold depression are merely illustrative and intended as an example showing maximum fuel economy conditions for one engine transmission combination. It is intended that this invention may be applied to other engine transmission combinations having different speed characteristics, manifold vacuum characteristics and gear ratios by determining the optimum operating ranges in selected gear ratios as illustrated in FIGURES 2a, 2b and 2c for other engine transmission combinations providing optimum efficiency and to program the upshift and downshift signals accordingly to obtain maximum fuel economy.

The above described preferred embodiment is illustrative of the invention and which may be modified within the scope of the appended claims.

I claim:

1. In a transmission control mechanism; an engine having an accelerator pedal and a source of manifold vacuum; a transmission providing a first through a fourth gear ratio drives having ratio control means to select each of said ratio drives; a main clutch connecting said engine to said transmission; governor means responsive to engine speed providing a low speed signal in a low speed range, an intermediate speed signal in an intermediate speed range and a high speed signal in a high speed range; a first switch controlled by said source of manifold vacuum being normally open and closed above a predetermined low manifold vacuum; a second switch closed when the said clutch is engaged and open when said clutch is disengaged, second, third and fourth ratio switches normally opened and operably connected to said transmission to close each of said ratio switches when the transmission is operating in said second, third and fourth gear ratios, respectively; downshift signal means connected to said governor means and said second switch and said ratio switches operative to provide a downshift signal in response to said low speed signal when any one of said ratio switches and said second switch is closed; and upshift signal means connected to said governor means and said switches operative to provide an upshift signal when the second ratio switch is closed, the first and second switches are closed in response to said high speed signal, and to provide an upshift signal when said third ratio switch is closed and said first and second switches are closed and in response to said intermediate speed signal.

2. In a transmission control mechanism; an engine having an accelerator pedal and a source of manifold vacuum; a transmission providing a first through a fourth gear ratio drives having ratio control means to select each of said ratio drives; a main clutch connecting said engine to said transmission; governor means responsive to engine speed providing a low speed signal in a low speed range, an intermediate speed signal in an intermediate speed range and a high speed signal in a high speed range; a first switch controlled by said source of manifold vacuum being normally open and closed above a predetermined low manifold vacuum; a second switch closed when the said clutch is engaged and open when said clutch is disengaged, first, second and third ratio switches normally opened and operably connected to said transmission to close each of said ratio switches when the transmission is operating in said second, third and fourth gear ratios, respectively; downshift signal means connected to said governor means and said second switch and said ratio switches operative to provide a downwshift signal and connected to said accelerator pedal to resist opening movement of said accelerator pedal in response to said low speed range signal when any one of said ratio switches and said second switch is closed; and upshift signal means connected to said governor means and said switches operative to provide an upshift signal when the second ratio switch is closed, the first and second switches are closed and in response to said high speed signal, and to provide an upshift signal when said third radio switch is closed and said first and second switches are closed and in response to said intermediate speed signal.

3. In a transmission control mechanism; an engine having an accelerator pedal and a source of manifold vacuum; a transmission driven by said engine providing a first through a fourth gear ratio drives having ratio control means to select each of said ratio drives; governor means responsive to engine speed providing a low speed signal in a low speed range, an intermediate speed signal in an intermediate speed range and a high speed signal in a high speed range; a first switch controlled by said source of manifold vacuum being normally open and closed above a predetermined low manifold vacuum; second, third and fourth ratio switches normally opened and operably connected to said transmission to close each of said ratio switches when the transmission is operating in said second, third and fourth gear ratios, respectively; downshift signal means connected to said governor means and said ratio switches operative to provide a downshift signal in response to said low speed range signal when any one of said ratio switches is closed; upshaft signal means connected to said governor means and said switches; operative to provide an upshift signal when the second ratio switch is closed, the first switch is closed and in response to said high speed signal, and to provide an upshift signal when said third ratio switch is closed and said first switch is closed and in response to said intermediate speed signal.

4. In a transmission control mechanism; an engine having an accelerator pedal and a source of manifold vacuum; a transmission providing at least three gear ratio drives having ratio control means to select each of said ratio drives; a main clutch connecting said engine to said transmission; governor means responsive to engine speed providing a low speed signal in a low speed range and a high speed signal in a high speed range; a first switch controlled by said source of manifold vacuum being normally open and closed above a predetermined low manifold vacuum; a second switch closed when the said clutch is engaged and open when said clutch is disengaged; second and third ratio switches normally opened and operably connected to said transmission to close each of said ratio switches when the transmission is operating in a second and a third gear ratio, respectively; downshift signal means connected to said governor means and said second switch and said ratio switches operative to provide a downshift signal in response to said low speed range signal, when one of said second and third ratio switches is closed and said second switch is closed; and means connected to said governer means, said second ratio switch and said first and second switches operative to provide an upshift signal when the second ratio switch is closed, the first and second switches are closed and in response to said high speed signal.

5. In a transmission control mechanism; an accelerator control and a line manifold vacuum for connecting to an engine manifold; a transmission providing at least three gear ratio drives having ratio control means to select each of said ratio drives; said transmission having a main clutch; governor means responsive to transmission input speed providing a low speed signal in a low speed range and a high speed signal in a high speed range; a first switch controlled by said source of manifold vacuum being normally open and closed above a predetermined low manifold vacuum; a second switch closed when the said clutch is engaged and open when said clutch is disengaged, second and third ratio switches normally opened and operably connected to said transmission to close each of said ratio switches when the transmission is operating in a second and a third gear ratio, respectively; downshift signal means connected to said governor, said second and third ratio switches and said second switch operative to provide a downshift signal consisting of a visual signal and a resisting force applied to said accelerator in response to said low speed range signal, said second and third ratio switches and said second switch are closed; and means connected to said governor, said second ratio switch, said first switch and said second switch operative to provide an upshift signal consisting of a resisting force applied to said accelerator when the second ratio switch is closed, the first and second switches are closed and in response to said high speed signal.

6. In a transmission control mechanism, an engine having an accelerator pedal and a source of manifold vacuum, a transmission driven by said engine providing at least three gear ratio drives having ratio control means to select each of said ratio drives, governor means responsive to engine speed providing a speed signal in a low speed range and a high speed range, a first switch conrolled by said source of manifold vacuum being normally open and closed above a predetermined low manifold vacuum, second and third ratio switches normally opened and operably connected to said transmission to close each of said ratio switches when the transmission is operating in a second and a third gear ratio, respectively; downshift signal means connected to said governor means and said second and third ratio switches operative to provide a downshift signal in response to said low speed range signal when said second and third ratio switches are closed; and means connected to said governor means, said first switch and said second ratio switch operative to provide an upshift signal when the second ratio switch is closed, the first switch is closed, and in response to said high speed signal.

7. In a transmission control mechanism, an engine having a source of manifold vacuum, a transmission driven by said engine providing at least three gear ratio drives having ratio control means to select each of said ratio drives, governor means responsive to engine speed providing a speed signal in a low speed range, downshift signal means connected to said governor means and said ratio control means operative to provide a downshift signal in response to said low speed range signal, and operation of said transmission in a second and third ratio.

8. In a transmission control mechanism, an engine having a source of manifold vacuum, a transmission driven by said engine providing at least three gear ratio drives having ratio control means to select each of said ratio drives, governor means responsive to engine speed providing a speed signal in a low speed range and a high speed range, downshift signal means connected to said governor means and said ratio control means operative to provide a downshift signal in response to said low speed range signal, operation of said transmission in a second and third ratio; and means connected to said governor means, said ratio control means operative to provide an upshift signal when said transmission is operating in second ratio, said manifold vacuum is above a predetermined value, and in response to said high speed signal.

9. In a transmission control mechanism, an engine having a source of manifold vacuum, a transmission providing at least three gear ratio drives having ratio control means to select each of said ratio drives, a main clutch connecting said engine to said transmission, governor means responsive to engine speed providing a speed signal in a low speed range and a high speed range, downshift signal means connected to said governor means, said ratio control means and said main clutch operative to provide a downshift signal in response to said low speed range signal, operative when said transmission is in a second and third ratio and during engagement of said main clutch; and means connected to said governor means, said clutch and said ratio control means and said source of manifold vacuum operative to provide an upshift signal when said transmission is operating in second ratio, said manifold vacuum is above a predetermined value, said clutch is engaged and in response to said high speed signal.

10. In a transmission control mechanism, an engine having an accelerator pedal and a source of manifold vacuum, a transmission providing a plurality of gear ratio drives having ratio control means to select each of said ratio drives, a main clutch connecting said engine to said transmission, a governor responsive to engine speed providing a speed signal in a low speed range and a high speed range, downshift signal means connected to said governor, said ratio control means and said main clutch operative to provide a downshift signal including means operatively connected to said accelerator to resist opening movement of said accelerator in response to said low speed range signal, operative when said transmission is in a higher ratio and during engagement of said main clutch; and means connected to said governor, said ratio control means and said clutch and said source of manifold vacuum operative to provide an upshift signal including means operatively connected to said accelerator to resist opening movement of said accelerator when said transmission is operating in a lower ratio, said manifold vacuum is above a predetermined value, said clutch is engaged and in response to said high speed signal.

11. In a transmission control mechanism, an engine having an accelerator pedal and a source of manifold vacuum, a transmission driven by said engine providing a plurality of gear ratio drives having ratio control means to select each of said ratio drives, a governor responsive to engine speed providing a speed signal in a low speed range and a high speed range, downshift signal means connected to said governor and said ratio control means operative to provide a downshift signal including means operatively connected to said accelerator to resist opening movement of said accelerator in response to said low speed range signal, operative when said transmission is in a higher ratio; and means connected to said governor, said ratio control means and said source of manifold vacuum operative to provide an upshift signal including means operatively connected to said accelerator to resist opening movement of said accelerator when said transmission is operating in a lower ratio, said manifold vacuum is above a predetermined value and in response to said high speed signal.

12. In a transmission control mechanism, an engine having an accelerator pedal, a transmission driven by said engine providing a plurality of gear ratio drives having ratio control means to select each of said ratio drives, a governor responsive to engine speed providing a speed signal in a low speed range and a high speed range, downshift signal means connected to said governor and said ratio control means operative to provide a downshift signal including means operatively connected to said accelerator to resist opening movement of said accelerator in response to said low speed range signal, operative when said transmission is in a higher ratio; and means connected to said governor and said ratio control means operative to provide an upshift signal including means operatively connected to said accelerator to resist opening movement of said accelerator when said transmission is operating in a lower ratio in response to said high speed signal.

13. In a transmission control mechanism, an engine having an accelerator pedal, a transmission driven by said engine providing a plurality of gear ratio drives having ratio control means to select each of said ratio drives, downshift signal means connected to said transmission and engine operative to provide a downshift signal including means operatively connected to said accelerator to resist opening movement of said accelerator in response to engine and transmission operating conditions; and means connected to said transmission and engine operative to provide an upshift signal including means operatively connected to said accelerator to resist opening movement of said accelerator responsive to transmission and engine operating conditions.

14. In a transmission control mechanism, an engine having an accelerator pedal, a transmission driven by said engine providing a plurality of gear ratio drives having ratio control means to select each of said ratio drives, signal means connected to said engine and said transmission operative to provide a shift signal including means operatively connected to said accelerator to resist opening movement of said accelerator in response to engine and transmission operating conditions.

15. In a transmission control system for a transmission providing a plurality of ratio drives driven by an engine having a manually actuated fuel control; the combination of transmission sensing means for connecting to a transmission for sensing the drive ratio in which the transmission is operating; engine sensing means for connecting to an engine for sensing a condition of engine operation; resisting means for connecting to a fuel control operative in one position for resisting movement of a manual fuel control in substantially all positions of said manual fuel control and inoperative in another position; and means for providing a shift signal operatively connected to said transmission sensing means, said engine sensing means and said resisting means operative in response to said transmission sensing means sensing certain drive ratios and said engine sensing means sensing certain engine operating conditions conjointly to actuate said resisting means in said one position to resist movement of said manual fuel control in substantially all positions.

16. In a transmission control system, a transmission providing a plurality of ratio drives driven by an engine having a manually actuated fuel control, the combination of transmission sensing means connected to said transmission for sensing the drive ratio in which the transmission is operating, engine sensing means connected to said engine for sensing a condition of engine operation, resisting means connected to said fuel control operative in one position for resisting movement of a manual fuel control in substantially all positions of said manual fuel control and inoperative in another position, and means for providing a shift signal operatively connected to said transmission sensing means, said engine sensing means and said resisting means operative in response to said transmission sensing means sensing certain drive ratios and said engine sensing means sensing certain engine operating conditions conjointly to actuate said resisting means in said one position to resist movement of said manual fuel control in substantially all positions.

17. In a transmission control system for a power unit having transmission providing a plurality of ratio drives driven by an engine having a manually actuated fuel control, the combination of power plant sensing means for connecting to a power plant for sensing a condition of power plant operation, resisting means for connecting to a fuel control operative in one position for resisting movement of a manual fuel control in substantially all positions of said manual fuel control to a different degree to signal the operator and inoperative in another position, and means for providing a signal operatively connected to said power plant sensing means and said resisting means operative in response to said power plant sensing means sensing certain operating conditions to actuate said resisting means in said one position to resist movement of said manual fuel control in substantially all positions to a different degree to signal the operator.

References Cited in the file of this patent

UNITED STATES PATENTS

| | | |
|---|---|---|
| 2,187,824 | Britton | Jan. 23, 1940 |
| 2,909,078 | Nallinger | Oct. 20, 1959 |
| 2,918,652 | Epstein | Dec. 22, 1959 |